US008107422B2

(12) United States Patent
Hsu

(10) Patent No.: US 8,107,422 B2
(45) Date of Patent: Jan. 31, 2012

(54) METHOD AND APPARATUS FOR UPLINK AND DOWNLINK CHANNEL ALIGNMENTS FOR 3GPP CONTINUOUS PACKET DATA CONNECTION (CPC) CHANNELS

(75) Inventor: Liangchi Alan Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 686 days.

(21) Appl. No.: 12/237,880

(22) Filed: Sep. 25, 2008

(65) Prior Publication Data

US 2010/0074188 A1    Mar. 25, 2010

(51) Int. Cl.
*H04W 4/00*  (2009.01)
(52) U.S. Cl. ..................................... 370/328; 455/422.1
(58) Field of Classification Search .......................... None
See application file for complete search history.

(56) References Cited

U.S. PATENT DOCUMENTS

| 2003/0185159 | A1* | 10/2003 | Seo et al. ...................... 370/278 |
| 2008/0049683 | A1* | 2/2008 | Nakamata et al. ............ 370/335 |
| 2009/0086682 | A1* | 4/2009 | Kazmi et al. ................. 370/335 |

FOREIGN PATENT DOCUMENTS

| WO | WO2007025138 | 3/2007 |
| WO | WO2008052201 | 5/2008 |
| WO | WO2008069950 | 6/2008 |

OTHER PUBLICATIONS

International Search Report and Written Opinion—PCT/US2009/058485, International Search Authority—European Patent Office, Dec. 17, 2009.
Universal Mobile Telecommunications System (UMTS); Physical layer procedures (FDD) (3GPP TS 25.214 version 7.9.0 Release 7); ETSI TS 125 214 ETSI Standard, European Telecommunications Standards Institute (ETSI), Sophia Antipolis Cedex, France, vol. 3-R1 No. V7.9.0, Jul. 1, 2008, XP014042107 pp. 59-65, paragraphs 6C,6C.2,6C.3,6C.4; figures 2A,2B,2C,2D.

* cited by examiner

*Primary Examiner* — Clemence Han
(74) *Attorney, Agent, or Firm* — Darren M. Simon

(57) ABSTRACT

An apparatus and method for implementing uplink and downlink channel fine time alignments for 3GPP continuous packet data connection (CPC) channels comprising determining if a HS-SCCH radio frame boundary is detected before a UL DPCCH radio frame boundary; aligning a transition of a UE_DTX_DRX_Enabled control signal from FALSE to TRUE to the HS-SCCH radio frame boundary or the UL DPCCH radio frame boundary, tagging a first DRX subframe to be 0, and tagging a first DTX subframe to be 0 depending on the determination; and monitoring configuration signals to determine alignments. In one aspect, the order of the tagging depends on the determination.

19 Claims, 6 Drawing Sheets

METHOD AND APPARATUS FOR UPLINK AND DOWNLINK CHANNEL ALIGNMENTS FOR 3GPP CONTINUOUS PACKET DATA CONNECTION (CPC) CHANNELS

FIELD

This disclosure relates generally to apparatus and methods for channel alignments. More particularly, the disclosure relates to uplink and downlink channel alignments for 3GPP continuous packet data connection (CPC) channels.

BACKGROUND

Both wired and wireless communications systems are migrating from a traditional circuit-switched architecture to a more flexible packet-switched architecture. With packet-switched communications, each communications session is decomposed into exchanges of a series of small data packets, each of which contains addressing information in its header to allow for flexible, independent routing of each data packet. The data packets are sent from the source to a destination via a cascade of transmission paths and network nodes. The transmission paths may differ for each packet depending on routing decisions made at each network node.

Wireless communications networks are also adopting a packet-switched communications mode. In one example, Universal Mobile Telecommunications System (UMTS) includes packet-oriented communications such as high-speed downlink packet access (HSDPA) and high-speed uplink packet access (HSUPA). In some cases, active data transmission occurs intermittently over a long time period. On the other hand, the system wants to avoid frequent connection termination and re-establishment to minimize data overhead and setup delay. Wireless providers aim to offer a perceived continuous connection similar to those offered by typical fixed broadband networks, for example, digital subscriber line (DSL) technology. However, maintenance of active control channels to keep a packet-switched communication mode available can result in an undesired increased noise level impacting system user capacity.

Continuous packet data connection (CPC) is an enhancement to Universal Mobile Telecommunications System (UMTS) to keep a high-speed packet channel in active state for a long time period without data transfer by reducing signaling during this time. Configuration of the CPC involves both semi-static and dynamic parameters settings. Since a global parameter (e.g., UE_DTX_DRX_Enabled) is used in the $3^{rd}$ Generation Partnership Project (3GPP) standard, the discontinuous transmission (DTX) and discontinuous reception (DRX) configurations take place at the same time upon setting the global parameter. However, because of the uplink (UL) and downlink (DL) channel sub-frame offset, it is not feasible to achieve fine time alignment of the UL/DL channels for various continuous packet data connection (CPC) channels.

SUMMARY

Disclosed is an apparatus and method for implementing uplink and downlink channel fine time alignments for 3GPP continuous packet data connection (CPC) channels. According to one aspect, a method for implementing uplink and downlink channel fine time alignments for 3GPP continuous packet data connection (CPC) channels comprising determining if a HS-SCCH radio frame boundary is detected before a UL DPCCH radio frame boundary; if the HS-SCCH radio frame boundary is detected before the UL DPCCH radio frame boundary, aligning a transition of a UE_DTX_DRX_Enabled control signal from FALSE to TRUE to the HS-SCCH radio frame boundary, tagging a first DRX subframe to be 0, and then tagging a first DTX subframe to be 0; if the UL DPCCH radio frame boundary is detected before the HS-SCCH radio frame boundary, aligning the transition of the UE_DTX_DRX_Enabled control signal from FALSE to TRUE to the UL DPCCH radio frame boundary, tagging the first DTX subframe to be 0, and then tagging the first DRX subframe to be 0; and monitoring configuration signals DL_DRX_Active and UL_DTX_Active, and if the configuration signals DL_DRX_Active is FALSE and UL_DTX_Active is TRUE, aligning the transition of the UE_DTX_DRX_Enabled control signal from FALSE to TRUE to the UL DPCCH radio frame boundary.

According to another aspect, a user equipment comprising a processor and a memory, the memory containing program code executable by the processor for performing the following: determining if a HS-SCCH radio frame boundary is detected before a UL DPCCH radio frame boundary; aligning a transition of a UE_DTX_DRX_Enabled control signal from FALSE to TRUE to the HS-SCCH radio frame boundary, tagging a first DRX subframe to be 0, and then tagging a first DTX subframe to be 0, if the HS-SCCH radio frame boundary is detected before the UL DPCCH radio frame boundary; aligning the transition of the UE_DTX_DRX_Enabled control signal from FALSE to TRUE to the UL DPCCH radio frame boundary, tagging the first DTX subframe to be 0, and then tagging the first DRX subframe to be 0, if the UL DPCCH radio frame boundary is detected before the HS-SCCH radio frame boundary; and monitoring configuration signals DL_DRX_Active and UL_DTX_Active, and if the configuration signals DL_DRX_Active is FALSE and UL_DTX_Active is TRUE, aligning the transition of the UE_DTX_DRX_Enabled control signal from FALSE to TRUE to the UL DPCCH radio frame boundary.

According to another aspect, a wireless device for implementing uplink and downlink channel fine time alignments for 3GPP continuous packet data connection (CPC) channels, the wireless device comprising means for determining if a HS-SCCH radio frame boundary is detected before a UL DPCCH radio frame boundary; means for aligning a transition of a UE_DTX_DRX_Enabled control signal from FALSE to TRUE to the HS-SCCH radio frame boundary, tagging a first DRX subframe to be 0, and then tagging a first DTX to be 0, if the HS-SCCH radio frame boundary is detected before the UL DPCCH radio frame boundary; means for aligning the transition of the UE_DTX_DRX_Enabled control signal from FALSE to TRUE to the UL DPCCH radio frame boundary, tagging the first DTX subframe to be 0, and then tagging the first DRX subframe to be 0, if the UL DPCCH radio frame boundary is detected before the HS-SCCH radio frame boundary; means for monitoring configuration signals DL_DRX_Active and UL_DTX_Active; and means for aligning the transition of the UE_DTX_DRX_Enabled control signal from FALSE to TRUE to the UL DPCCH radio frame boundary, if the configuration signals DL_DRX_Active is FALSE and UL_DTX_Active is TRUE.

According to another aspect, a computer-readable medium including program code stored thereon, comprising program code for determining if a HS-SCCH radio frame boundary is detected before a UL DPCCH radio frame boundary; program code for aligning a transition of a UE_DTX_DRX_Enabled control signal from FALSE to TRUE to the HS-SCCH radio frame boundary, tagging a first DRX subframe to be 0, and then tagging a first DTX subframe to be 0, if the HS- SCCH radio frame boundary is detected before the UL DPCCH radio frame boundary; program code for aligning the transition of the UE_DTX_DRX_Enabled control signal from FALSE to TRUE to the UL DPCCH radio frame boundary, tagging the first DTX subframe to be 0, and then tagging the first DRX to be 0, if the UL DPCCH radio frame boundary is detected before the HS-SCCH radio frame boundary; and program code for monitoring configuration signals DL_DRX_Active and UL_DTX_Active, and if the configuration signals DL_DRX_Active is FALSE and UL_DTX_Active is TRUE, aligning the transition of the UE_DTX_DRX_Enabled control signal from FALSE to TRUE to the UL DPCCH radio frame boundary.

Advantages of the present disclosure include achieving uplink and downlink channel fine time alignments for various continuous packet data connection (CPC) channels consistent with the 3GPP Rel-7 specification.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 1:
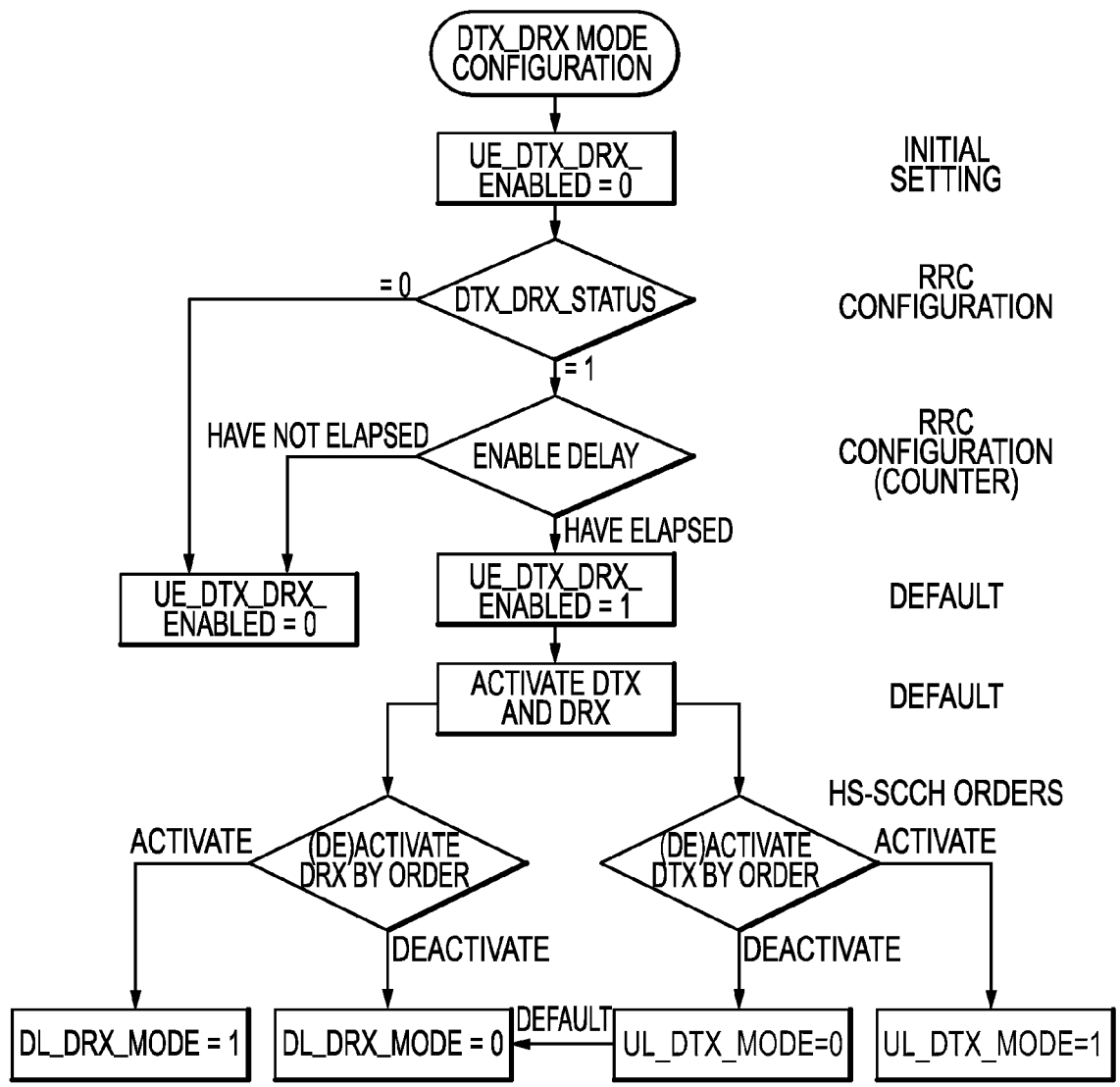
FIG. 1 is an example of a continuous packet data connection (CPC) configuration procedure.
Figure 2:
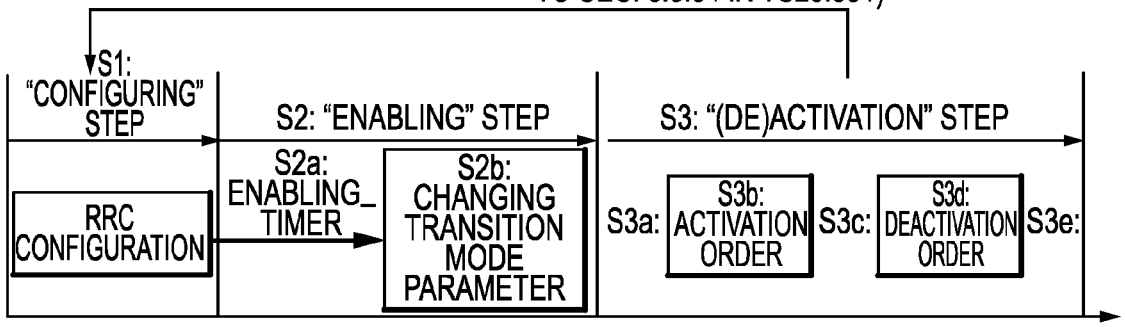
FIG. 2 is an example state diagram for the CPC configuration procedure illustrated in FIG. 1.

FIG. 1 is an example of a continuous packet data connection (CPC) configuration procedure. This configuration procedure is executed prior to the channel alignment procedure to be discussed subsequently. FIG. 2 is an example state diagram for the CPC configuration procedure illustrated in FIG. 1. In a broad view, the CPC configuration procedure shown in FIG. 1 consists of three steps: a configuring step, an enabling step, and an activating step. FIG. 2 illustrates these three steps: step 1 (S1) "Configuring", step 2 (S2) "Enabling", and Step 3 (S3) "Activating". One skilled in the art would understand that the three steps shown in FIG. 2 can be iterative. For example, in step 3, reconfiguration related Radio Resource Control (RRC) messages can bring the procedures back to step 1.

In one example, the first step (S1), the "configuring" step, is enabled through the RRC high level signaling from the network to the user equipment (UE) to set a status parameter. This status parameter has to be turned "ON" before detailed parameters (e.g. timing, cycle, etc.) of each CPC mode can be activated. This RRC CPC mode configuration, via setting the parameter of DTX_DRX_STATUS, serves as the "main switch" to turn the DTX/DRX mode ON or OFF.

The second step (S2), the "enabling" step, follows the first step S1 to enable DTX/DRX modes. The "enabling" step is required during the CPC initialization. At the UE initialization as well as CPC initialization stages, DTX/DRX modes are assumed to be DISABLED. In one example, a timer (e.g., Enabling_Delay) is used as delay buffer during the CPC mode transition from DISABLED to ENABLED. Upon the timer expiration, the "enabling" step is completed and the UE stays in CPC DTX/DRX enabled mode unless the procedure returns to step 1 (S1). One condition for returning to S1 is receiving a RRC signaling message from the network.

Once the DTX/DRX modes have been enabled in step 2 (S2), the "(de)activating" step (S3), can take place at any time, i.e., step 3 (S3) is a "dynamic" step. Step 3 (S3), by using the High-Speed Shared Control Channel (HS-SCCH) orders sent from the network to the UE, is used to activate or deactivate the DRX or DTX modes as needed. High-Speed Shared Control Channel (HS-SCCH) is used in UMTS HSDPA system as the shared control channel to schedule HSDPA transmission. For CPC, this channel is also used to activate or deactivate DTX/DRX by carrying orders in HS-SCCH. In one example, following step 3 (S3), the UE returns to step 1 (S1) upon receiving a reconfiguration message, e.g., RRC CONNECTION SETUP, ACTIVE SET UPDATE, CELL UPDATE CONFIRM or another reconfiguration message. Examples of reconfiguration messages are listed in Section 8.5.34, TS25.331.

As shown in FIG. 1, the CPC configuration procedure involves several controlling parameters and settings which are related to, for example, initial setting, high-level RRC setting, timer, low-level signaling, and default relation. These controlling parameters and settings are illustrated in Table 1. The controlling parameters and settings are found in the steps of the CPC configuration procedure illustrated in FIG. 1.

The 3GPP Rel-7 specification does not address the fine time alignment of uplink (UL) and downlink (DL) channels when the UE_DTX_DRX_Enabled value is changed from initial value 0 (i.e., DISABLED) to 1 (i.e., ENABLED). A single global parameter, UE_DTX_DRX_Enabled, is used to enable the UL channel and DL channel globally. The UL and DL channels are enabled approximately at the same time without individual control of the UL and DL channels.

is set to 1 if UE_DTX_DRX_Enabled=1 and discontinuous uplink dedicated physical control channel (UL DPCCH) transmission is activated. The UL DPCCH is the physical channel on which the signaling is transmitted on the uplink by the UE, for example, to a base transceiver station. Similarly, DL_DRX_ Active is set to 1 if UE_DTX_DRX_Enabled=1 and discontinuous downlink reception is activated. Only when the starting subframe is detected (i.e. aligned), can the UL_DTX_Active (or DL_DRX_Active) be set to 1.

The 3GPP Rel-7 specification does not unambiguously define the channel alignment procedure. In particular the 3GPP Rel-7 specification does not unambiguously define

TABLE 1

| CPC controlling parameters | Name | Value | Explanation |
|---|---|---|---|
| initial setting | UE_DTX_DRX_Enabled (a.k.a. DTX_DRX_mode) | Initial value = 0 | A transition parameter during CPC mode configuration procedure. This is a way to indicate DTX/DRX is ON or OFF. |
| high-level RRC setting | DTX_DRX_STATUS | TRUE or FALSE | This is the "main switch" to turn CPC mode ON or OFF via RRC signaling. When the UE is in Step 3 (FIG. 2), it can receive RRC message and go to Step 1. |
| timer | Enabling_Delay | Number of radio frames | This is to "control" the transition period from UE_DTX_DRX_Enabled = OFF to ON. |
| low-level signaling | HS-SCCH Order | (De)ACTIVATE | This is to activate or deactivate DTX/DRX operation. |
| default relation | DTX/DRX relation | If UE is in DRX, then it always is in DTX | This is only (default) autonomous relation between DTX/DRX modes. |
| | UE_DTX_DRX_Enabled (a.k.a. DTX_DRX_mode) | After Enabling_Delay timer expires, default value = 1 | |
| | DTX/DRX activated | Upon UE_DTX_DRX_Enabled (i.e. DTX_DRX_mode) being changed from 0 to 1, both DTX/DRX modes are activated. | |

As part of the CRC configuration procedure, the UE sets DTX_DRX_STATUS to TRUE when it receives RRC CONNECTION SETUP, ACTIVE SET UPDATE, CELL UPDATE CONFIRM, or any reconfiguration message, and the following conditions are met:
 The UE is in CELL_DCH state;
 Both variables HS_DSCH RECEPTION and E_DCH_TRANSMISSION are set to TRUE;
 No DCH transport channel is configured; (i.e. there is no Rel-99 transport channel configured)
 The variable DTX_DRX_PARAMS is set;
 The UE has received the information element (IE) "DTX-DRX timing information".

In the alternative, the UE sets DTX_DRX_STATUS to FALSE, if any of the above conditions are not met and DTX_DRX_STATUS is set to TRUE.
Consequentially, the UE shall:
 Set the variable DTX_DRX_STATUS to FALSE;
 Clear the variable DTX_DRX_PARAMS; and
 Stop DTX-DRX mode related activities.

Furthermore, there are two dynamic status parameters UL_DTX_Active and DL_DRX_ Active. UL_DTX_ Active uplink and downlink channel fine time alignments for 3GPP continuous packet data connection (CPC) channels. Design considerations must be taken into account to achieve uplink and downlink channel fine time alignments. In one example, when the UE DRX/DTX mode is transitioned from DISABLED to ENABLED, uplink and downlink channel fine time alignments are needed.

As shown in FIG. 2, when the UE is transitioning from step S2a to step S2b, the UE starts aligning downlink (DL) and uplink (UL) channels for CPC operations and the numbering of DL/UL sub-frames. However, the 3GPP Rel-7 specification does not explicitly specify the DL and UL channel fine time alignment procedure upon UE DRX/DTX mode transitioning. For example, the following design considerations are not taken into account by the 3GPP Rel-7 specification: DL and UL timing, subframe inter-relation, Tau-dpch (DPCH Frame Offset) and Tau-f-dpch (F-DPCH Frame Offset), etc. The DPCH Frame Offset is the offset of the DL DPCH to the P-CCPCH (for example, see 3GPP TS 25.331 s10.3.6.21 and 25.211 FIG. 29). The F-DPCH Frame Offset is the offset of the DL F-DPCH to the P-CCPCH.

The following design considerations must be taken into account to achieve uplink and downlink channel fine time alignments:

Upon the transition of UE_DTX_DRX_Enabled from FALSE (i.e. DISABLED) to TRUE (i.e. ENABLED) in the step 2b in FIG. 2, the UL and DL channel fine time alignments (specifically the UL DTX and DL DRX channel fine time alignments) should be aligned separately.

The UL channel fine time alignment is based on uplink dedicated physical control channel (UL DPCCH), while the DL channel fine time alignment is based on high speed shared control channel (HS-SCCH).

The sequence of UL and DL channel fine time alignments depend on which channel frame boundary is detected first. For example, if HS-SCCH frame boundary is detected before UL DPCCH frame boundary, the discontinuous reception (DRX) subframe numbering should take place before the discontinuous transmission (DTX) subframe numbering. Similarly, for example, if UL DPCCH frame boundary is detected before HS-SCCH frame boundary, the discontinuous transmission (DTX) subframe numbering should take place before the discontinuous reception (DRX) subframe numbering.

In the step S2b shown in FIG. 2, the global parameter UE_DTX_DRX_Enabled is toggled. The single global parameter, UE_DTX_DRX_Enabled, is used to enable the UL channel and DL channel globally. In some instances, the UL-DPCCH and HS-SCCH are misaligned depending on the values of Tau-f-dpch and/or Tau-dpch.

Figure 3:
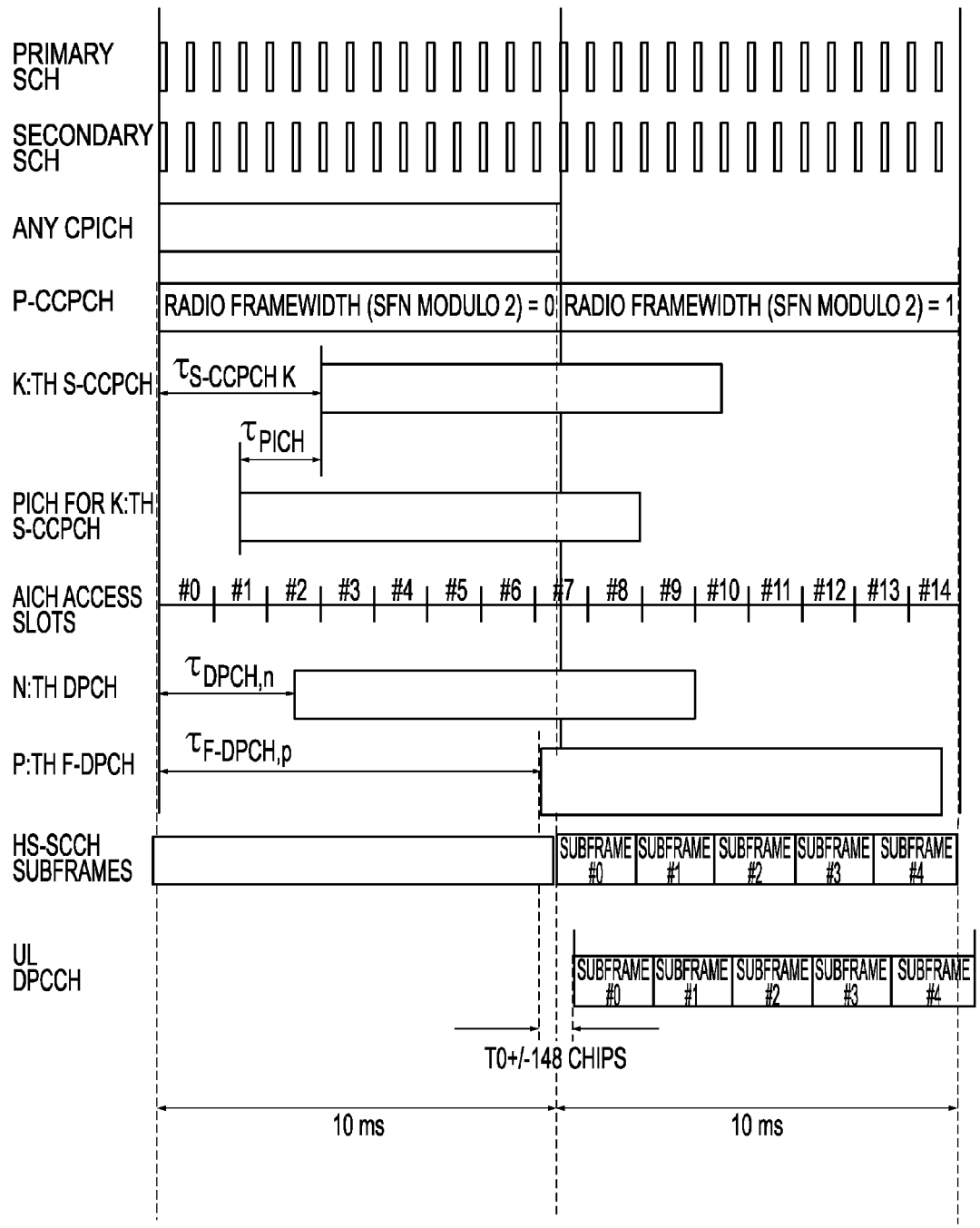
FIG. 3 illustrates an example channel timing where the HS-SCCH frame boundary is "ahead" of the UL DPCCH frame boundary.
Figure 4:
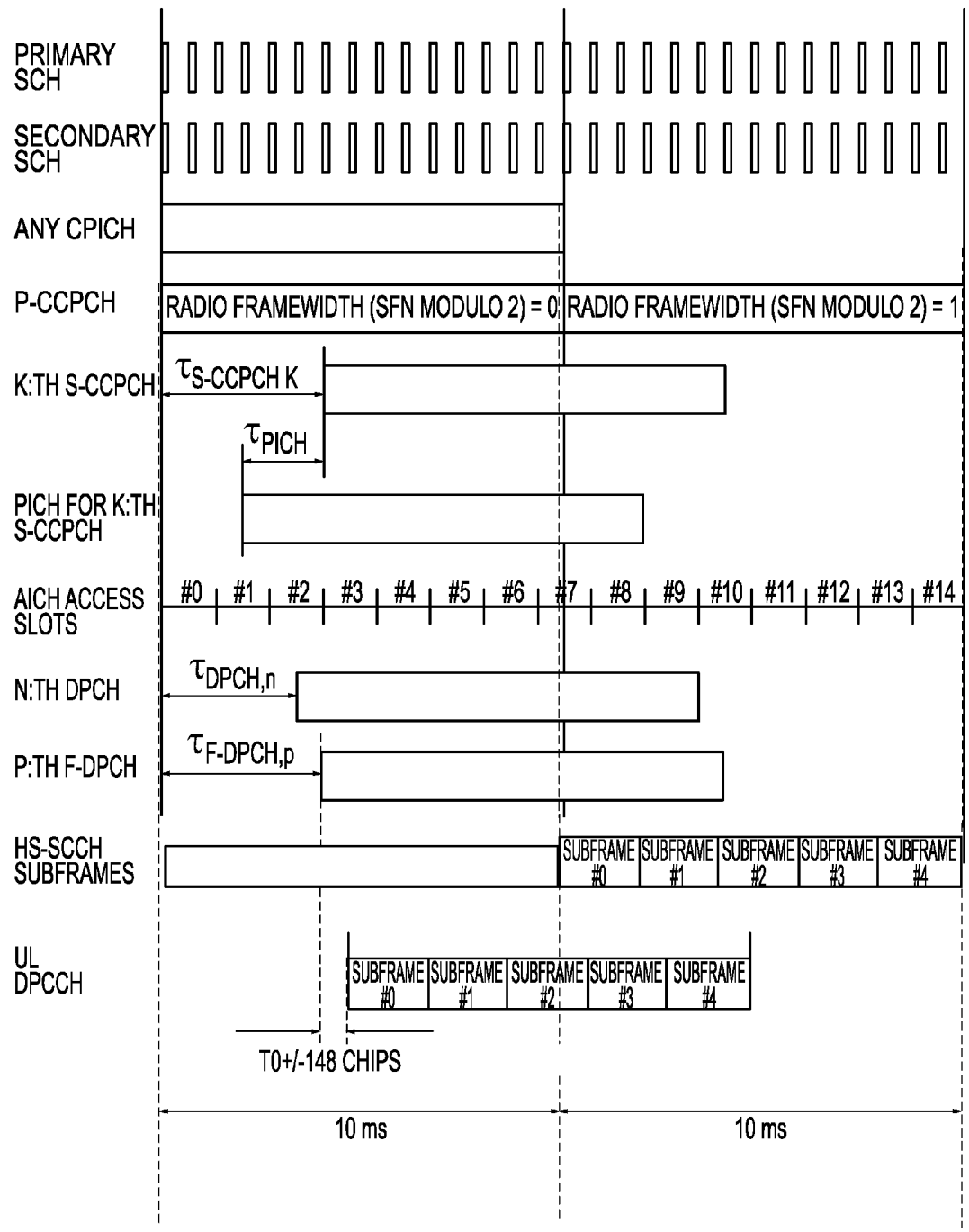
FIG. 4 illustrates an example channel timing where the UL DPCCH frame boundary is "ahead" of the HS-SCCH frame boundary.

FIG. 3 illustrates an example channel timing where the HS-SCCH frame boundary is "ahead" of the UL DPCCH frame boundary. FIG. 4 illustrates an example channel timing where the UL DPCCH frame boundary is "ahead" of the HS-SCCH frame boundary. In the examples of FIGS. 3 and 4, T0 is a constant defined to be 1024 chips. At the UE, the UL DPCCH frame transmission takes places approximately T0+/−148 chips after the reception of the first detected path of the corresponding downlink fractional dedicated physical channel (DL F-DPCH) frame. In one example, the fractional dedicated physical channel (F-DPCH) is a special case of downlink DPCCH and carries control information generated at Layer 1—TPC (Transmit Power Control) commands.

In addition to values of Tau-f-dpch and Tau-dpch, the time of transition (from step 2a to 2b of FIG. 2) relative to a P-CCPCH frame boundary also affects which channel is ahead of the other, for example, HS-SCCH and UL DPCCH.

Table 2 lists CPC configuration conditions and associated UL and DL channel fine time alignment steps for 3GPP continuous packet data connection (CPC) channels.

TABLE 2

| CPC Configuration Step defined in FIG. 2 | CPC Configuration Conditions | CPC Channel Fine Time Alignment Step |
|---|---|---|
| Step S1 and Step S2a | DTX_DRX_STATUS = TRUE<br>UE_DTX_DRX_Enabled = FALSE<br>DL_DRX_Active = FALSE<br>UL_DTX_Active = FALSE | No need for channel alignment. |
| Completion of Step S2b | DTX_DRX_STATUS = TRUE<br>UE_DTX_DRX_Enabled = TRUE<br>DL_DRX_Active = TRUE<br>UL_DTX_Active = TRUE | Based on Tau-f-dpch & Tau-dpch, if HS-SCCH radio frame boundary is detected first, then align UE_DTX_DRX_Enabled = TRUE (transitioned from FALSE) to HS-SCCH and tag the DRX subframe 0 first, then for UL DPCCH tag the DTX subframe 0. Vice versa. |
| Step S3d | DTX_DRX_STATUS = TRUE<br>UE_DTX_DRX_Enabled = TRUE<br>DL_DRX_Active = FALSE<br>UL_DTX_Active = TRUE | Align UE_DTX_DRX_Enabled = TRUE to UL-DPCCH. |
| Step S3d | DTX_DRX_STATUS = TRUE<br>UE_DTX_DRX_Enabled = TRUE<br>DL_DRX_Active = TRUE<br>UL_DTX_Active = FALSE | Based on Tau-f-dpch (& Tau-dpch), if HS-SCCH radio frame boundary is detected first, then align UE_DTX_DRX_Enabled = TRUE (transitioned from FALSE) to HS-SCCH and tag the DRX subframe 0 first, then for UL DPCCH tag the DTX subframe 0. Vice versa. (This is a transition step.) |
| Step S3 | DTX_DRX_STATUS = TRUE<br>UE_DTX_DRX_Enabled = TRUE<br>DL_DRX_Active = TRUE<br>UL_DTX_Active = TRUE | Based on Tau-f-dpch & Tau-dpch, if HS-SCCH radio frame boundary is detected first, then align UE_DTX_DRX_Enabled = TRUE (transitioned from FALSE) to HS-SCCH and tag the DRX subframe 0 first, then for UL DPCCH tag the DTX subframe 0. Vice versa. |
| Step S1 | DTX_DRX_STATUS = FALSE or UE_DTX_DRX_Enabled = FALSE | N/A |

Figure 5:
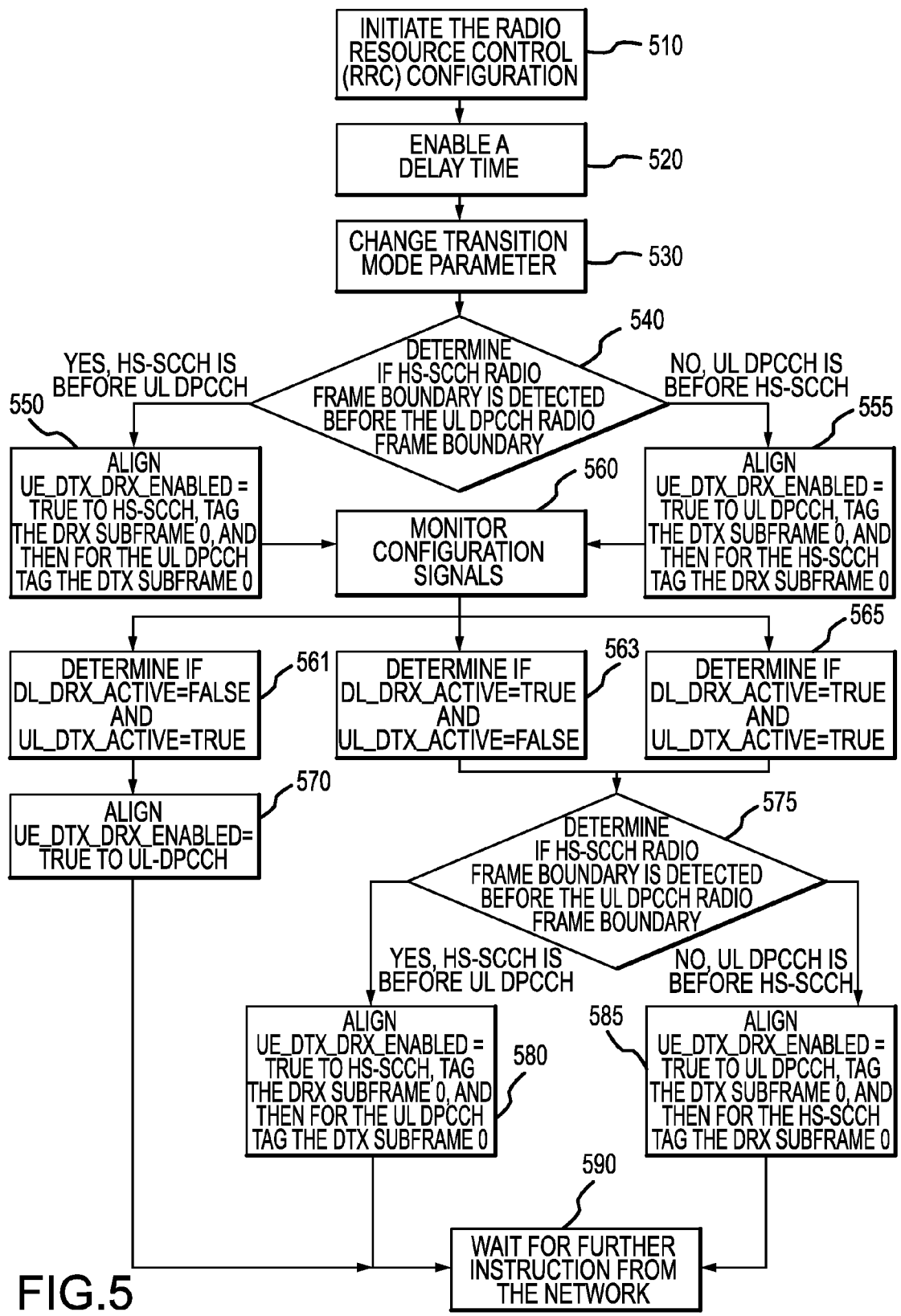
FIG. 5 illustrates an example flow diagram for implementing uplink and downlink channel fine time alignments for 3GPP continuous packet data connection (CPC) channels.

FIG. 5 illustrates an example flow diagram for implementing uplink and downlink channel fine time alignments for 3GPP continuous packet data connection (CPC) channels. In block 510 initiate the radio resource control (RRC) configuration. Following initiation, in block 520, enable a delay timer. The delay timer is used to control the transition period from UE_DTX_DRX_Enabled=FALSE to UE_DTX_DRX_Enabled=TRUE. The UE_DTX_DRX_Enabled control signal enables the DTX and DRX modes (i.e., discontinuous transmission and discontinuous reception modes).

In block 530, after the delay timer expires, change the transition mode parameter, i.e., transition UE_DTX_DRX_Enabled from FALSE to TRUE. By changing UE_DTX_DRX_Enabled to TRUE, the DTX and DRX modes are enabled. In block 540, determine if HS-SCCH radio frame boundary is detected before the UL DPCCH radio frame boundary. If the HS-SCCH radio frame boundary is detected before the UL DPCCH radio frame boundary, proceed to block 550. If the HS-SCCH radio frame boundary is not detected before the UL DPCCH radio frame boundary (i.e., the UL DPCCH radio frame boundary is detected before the HS-SCCH radio frame boundary), proceed to block 555. In block 550, align UE_DTX_DRX_Enabled=TRUE (i.e., transitioned from FALSE) to HS-SCCH, first tag the DRX subframe 0, and then for the UL DPCCH tag the DTX subframe 0. In other words, align the transition of the UE_DTX_DRX_Enabled control signal from FALSE to TRUE to the radio frame boundary of HS-SCCH. Following the alignment, tag the first DRX subframe to be 0. Next, tag the first DTX subframe (associated with UL DPCCH) to be 0.

In block 555, align UE_DTX_DRX_Enabled=TRUE (i.e., transitioned from FALSE) to UL DPCCH, first tag the DTX subframe 0, and then for the HS-SCCH tag the DRX subframe 0. In other words, align the transition of the UE_DTX_DRX_Enabled control signal from FALSE to TRUE to the radio frame boundary of UL DPCCH. Following the alignment, tag the first DTX subframe to be 0. Next, tag the first DRX subframe (associated with HS-SCCH) to be 0.

From either block 550 or block 555, proceed to block 560. In block 560, monitor the configuration signals (e.g., DL_DRX_Active and UL_DTX_Active) by decoding the DRX/DTX activating and deactivating orders on HS-SCCH. That is, wait for the configuration signals to be updated (i.e., change states).

In blocks 561, 563 and 565 determine whether downlink discontinuous reception is active (i.e., DL_DRX_Active TRUE or FALSE) and whether uplink discontinuous transmission is active (i.e., is UL_DTX_Active TRUE or FALSE). In block 561, determine if DL_DRX_Active=FALSE and UL_DTX_Active=TRUE. In block 563, determine if DL_DRX_Active=TRUE and UL_DTX_Active=FALSE. In block 565, determine if DL_DRX_Active=TRUE and UL_DTX_Active=TRUE.

From block 561 proceed to block 570. In block 570, align UE_DTX_DRX_Enabled=TRUE to UL-DPCCH. In other words, align the transition of the UE_DTX_DRX_Enabled control signal from FALSE to TRUE to the radio frame boundary of UL DPCCH. Following block 570, proceed to block 590.

From blocks 563 and 565 proceed to block 575. In block 575, determine if HS-SCCH radio frame boundary is detected before the UL DPCCH radio frame boundary. If the HS-SCCH radio frame boundary is detected before the UL DPCCH radio frame boundary, proceed to block 580. If the HS-SCCH radio frame boundary is not detected before the UL DPCCH radio frame boundary (i.e., the UL DPCCH radio frame boundary is detected before the HS-SCCH radio frame boundary), proceed to block 585. In block 580, align UE_DTX_DRX_Enabled=TRUE (i.e., transitioned from FALSE) to HS-SCCH, first tag the DRX subframe 0, and then for the UL DPCCH tag the DTX subframe 0. In block 585, align UE_DTX_DRX_Enabled=TRUE (i.e., transitioned from FALSE) to UL DPCCH, first tag the DTX subframe 0, and then for the HS-SCCH tag the DRX subframe 0. Following either block 580 or block 585, proceed to block 590.

In block 590, wait for further instructions from the network. In one example, the instruction from the network is to reinitiate the RRC configuration in block 510. In another example, the instruction from the network is to terminate the CPC mode. One skilled in the art would understand that other instructions from the network may be implemented without affecting the scope and spirit of the present disclosure.

One skilled in the art would understand that the steps illustrated in FIG. 5 are not exclusive, and that the steps may be modified according to the application, network parameters or design choice; and, other steps may be included without affecting the scope and spirit of the present disclosure. Furthermore, one skilled in the art would understand that some of the steps illustrated in FIG. 5 may be interchanged in their order without affecting the scope and spirit of the present disclosure.

Those of skill would further appreciate that the various illustrative components, logical blocks, modules, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that performs the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art.

Figure 6:
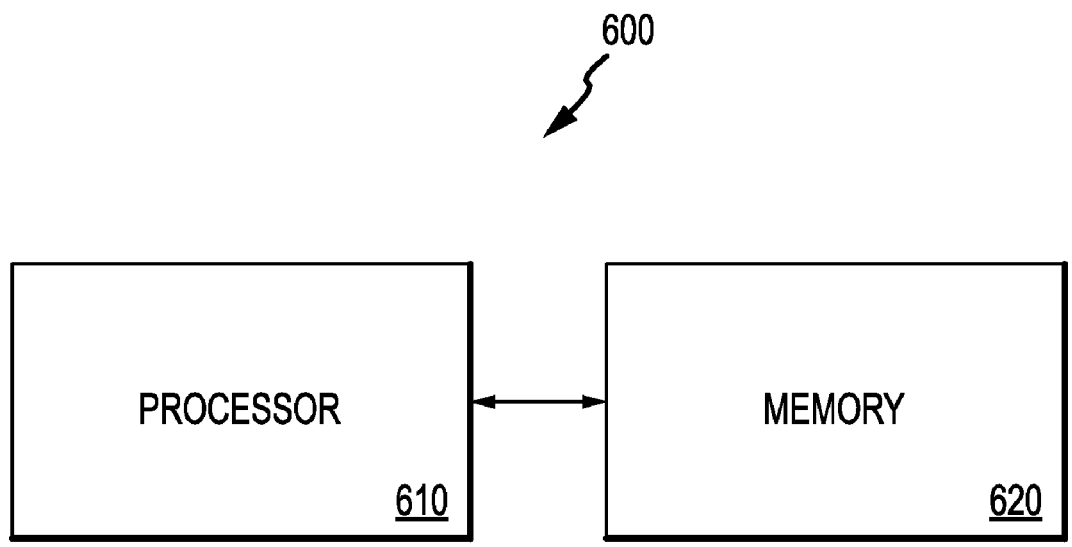
FIG. 6 illustrates an example of a device comprising a processor in communication with a memory for executing the processes for implementing uplink and downlink channel fine time alignments for 3GPP continuous packet data connection (CPC) channels.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 6 illustrates an example of a device 600 comprising a processor 610 in communication with a memory 620 for executing the processes for implementing uplink and downlink channel fine time alignments for 3GPP continuous packet data connection (CPC) channels. In one example, the device 600 is used to implement the algorithm illustrated in FIG. 5. In one aspect, the memory 620 is located within the processor 610. In another aspect, the memory 620 is external to the processor 610.

Figure 7:
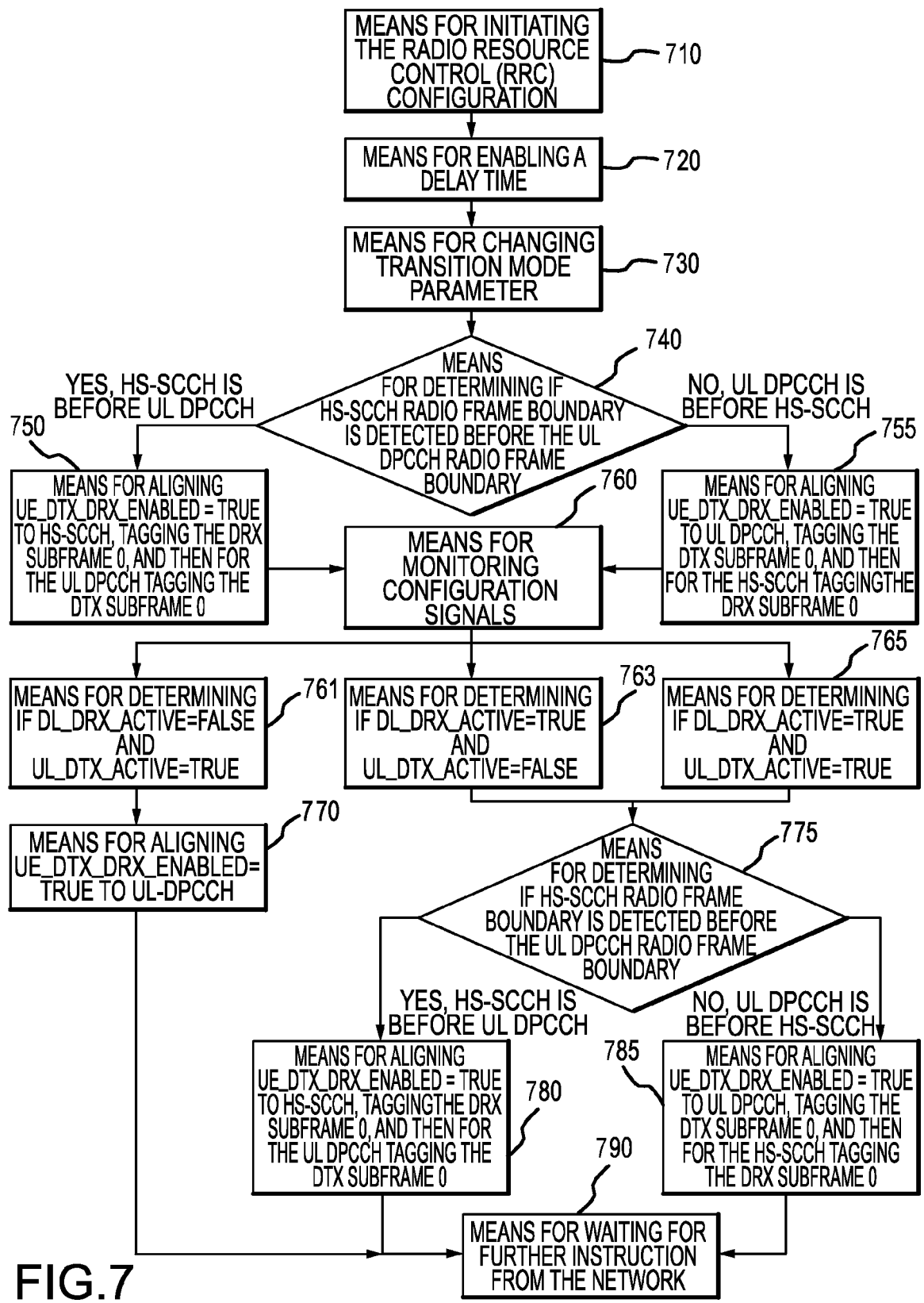
FIG. 7 illustrates an example of a device suitable for implementing uplink and downlink channel fine time alignments for 3GPP continuous packet data connection (CPC) channels.

FIG. 7 illustrates an example of a device 700 suitable for implementing uplink and downlink channel fine time alignments for 3GPP continuous packet data connection (CPC) channels. In one aspect, the device 700 is implemented by at least one processor comprising one or more modules configured to provide different aspects for implementing uplink and downlink channel fine time alignments for 3GPP continuous packet data connection (CPC) channels as described herein in blocks 710, 720, 730, 740, 750, 755, 760, 761, 763, 765, 770, 775, 780, 785 and 790. For example, each module comprises hardware, firmware, software, or any combination thereof. In one aspect, the device 700 is also implemented by at least one memory in communication with the at least one processor.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for implementing uplink and downlink channel fine time alignments for 3GPP continuous packet data connection (CPC) channels comprising:
   determining if a HS-SCCH radio frame boundary is detected before a UL DPCCH radio frame boundary;
   if the HS-SCCH radio frame boundary is detected before the UL DPCCH radio frame boundary, aligning a transition of a UE_DTX_DRX_Enabled control signal from FALSE to TRUE to the HS-SCCH radio frame boundary, tagging a first DRX subframe to be 0, and then tagging a first DTX subframe to be 0;
   if the UL DPCCH radio frame boundary is detected before the HS-SCCH radio frame boundary, aligning the transition of the UE_DTX_DRX_Enabled control signal from FALSE to TRUE to the UL DPCCH radio frame boundary, tagging the first DTX subframe to be 0, and then tagging the first DRX subframe to be 0; and
   monitoring configuration signals DL_DRX_Active and UL_DTX_Active, and if the configuration signals DL_DRX_Active is FALSE and UL_DTX_Active is TRUE, aligning the transition of the UE_DTX_DRX_Enabled control signal from FALSE to TRUE to the UL DPCCH radio frame boundary.

2. The method of claim 1 further comprising enabling a delay timer for use in controlling a transition period of the UE_DTX_DRX_Enabled control signal from FALSE to TRUE.

3. The method of claim 2 further comprising transitioning the UE_DTX_DRX_Enabled control signal from FALSE to TRUE following an expiration of the delay timer.

4. The method of claim 3 further comprising waiting for instructions from a network wherein the instruction is one of: to reinitiate a radio resource control (RRC) configuration or to terminate a continuous packet data connection (CPC) mode in the RRC configuration.

5. The method of claim 1 further comprising determining that the configuration signal DL_DRX_Active is TRUE.

6. The method of claim 5 further comprising:
   determining a second time if the HS-SCCH radio frame boundary is detected before the UL DPCCH radio frame boundary;
   if the HS-SCCH radio frame boundary is detected before the UL DPCCH radio frame boundary, aligning the transition of the UE_DTX_DRX_Enabled control signal from FALSE to TRUE to the HS-SCCH radio frame boundary, tagging the first DRX subframe to be 0, and then tagging the first DTX subframe to be 0; and
   if the UL DPCCH radio frame boundary is detected before the HS-SCCH radio frame boundary, aligning the transition of the UE_DTX_DRX_Enabled control signal from FALSE to TRUE to the UL DPCCH radio frame boundary, tagging the first DTX subframe to be 0, and then tagging the first DRX subframe to be 0.

7. The method of claim 6 further comprising waiting for instructions from a network wherein the instruction is one of: to reinitiate a radio resource control (RRC) configuration or to terminate a continuous packet data connection (CPC) mode in the RRC configuration.

8. A user equipment comprising a processor and a memory, the memory containing program code executable by the processor for performing the following:
   determining if a HS-SCCH radio frame boundary is detected before a UL DPCCH radio frame boundary;
   aligning a transition of a UE_DTX_DRX_Enabled control signal from FALSE to TRUE to the HS-SCCH radio frame boundary, tagging a first DRX subframe to be 0, and then tagging a first DTX subframe to be 0, if the HS-SCCH radio frame boundary is detected before the UL DPCCH radio frame boundary;
   aligning the transition of the UE_DTX_DRX_Enabled control signal from FALSE to TRUE to the UL DPCCH radio frame boundary, tagging the first DTX subframe to be 0, and then tagging the first DRX subframe to be 0, if the UL DPCCH radio frame boundary is detected before the HS-SCCH radio frame boundary; and
   monitoring configuration signals DL_DRX_Active and UL_DTX_Active, and if the configuration signals DL_DRX_Active is FALSE and UL_DRX_Active is TRUE, aligning the transition of the UE_DTX_DRX_Enabled control signal from FALSE to TRUE to the UL DPCCH radio frame boundary.

9. The user equipment of claim 8 wherein the memory further comprising program code for enabling a delay timer for use in controlling a transition period of the UE_DTX_DRX_Enabled control signal from FALSE to TRUE.

10. The user equipment of claim 9 wherein the memory further comprising program code for transitioning the UE_DTX_DRX_Enabled control signal from FALSE to TRUE following an expiration of the delay timer.

11. The user equipment of claim 8 wherein the memory further comprising program code for determining that the configuration signal DL_DRX_Active is TRUE.

12. The user equipment of claim 11 wherein the memory further comprising program code for:
   determining a second time if the HS-SCCH radio frame boundary is detected before the UL DPCCH radio frame boundary;
   aligning the transition of the UE_DTX_DRX_Enabled control signal from FALSE to TRUE to the HS-SCCH radio frame boundary, tagging the first DRX subframe to be 0, and then tagging the first DTX subframe to be 0, if the HS-SCCH radio frame boundary is detected before the UL DPCCH radio frame boundary; and
   aligning the transition of the UE_DTX_DRX_Enabled control signal from FALSE to TRUE to the UL DPCCH radio frame boundary, tagging the first DTX subframe to be 0, and then tagging the first DRX subframe to be 0, if the UL DPCCH radio frame boundary is detected before the HS-SCCH radio frame boundary.

13. The user equipment of claim 12 wherein the memory further comprising program code for waiting for instructions from a network wherein the instruction is one of: to reinitiate a radio resource control (RRC) configuration or to terminate a continuous packet data connection (CPC) mode in the RRC configuration.

14. A wireless device for implementing uplink and downlink channel fine time alignments for 3GPP continuous packet data connection (CPC) channels, the wireless device comprising:
- means for determining if a HS-SCCH radio frame boundary is detected before a UL DPCCH radio frame boundary;
- means for aligning a transition of a UE_DTX_DRX_Enabled control signal from FALSE to TRUE to the HS-SCCH radio frame boundary, tagging a first DRX subframe to be 0, and then tagging a first DTX to be 0, if the HS-SCCH radio frame boundary is detected before the UL DPCCH radio frame boundary;
- means for aligning the transition of the UE_DTX_DRX_Enabled control signal from FALSE to TRUE to the UL DPCCH radio frame boundary, tagging the first DTX subframe to be 0, and then tagging the first DRX subframe to be 0, if the UL DPCCH radio frame boundary is detected before the HS-SCCH radio frame boundary;
- means for monitoring configuration signals DL_DRX_Active and UL_DRX_Active; and
- means for aligning the transition of the UE_DTX_DRX_Enabled control signal from FALSE to TRUE to the UL DPCCH radio frame boundary, if the configuration signals DL_DRX_Active is FALSE and UL_DRX_Active is TRUE.

15. The wireless device of claim 14 further comprising means for transitioning the UE_DTX_DRX_Enabled control signal from FALSE to TRUE following an expiration of a delay timer.

16. The wireless device of claim 14 further comprising
- means for determining that the configuration signal DL_DRX_Active is TRUE;
- means for determining a second time if the HS-SCCH radio frame boundary is detected before the UL DPCCH radio frame boundary;
- means for aligning the transition of the UE_DTX_DRX_Enabled control signal from FALSE to TRUE to the HS-SCCH radio frame boundary, tagging the first DRX subframe to be 0, and then tagging the first DTX subframe to be 0, if the HS-SCCH radio frame boundary is detected before the UL DPCCH radio frame boundary; and
- means for aligning the transition of the UE_DTX_DRX_Enabled control signal from FALSE to TRUE to the UL DPCCH radio frame boundary, tagging the first DTX subframe to be 0, and then tagging the first DRX subframe to be 0, if the UL DPCCH radio frame boundary is detected before the HS-SCCH radio frame boundary.

17. A non-transitory computer-readable medium including program code stored thereon, comprising:
- program code for determining if a HS-SCCH radio frame boundary is detected before a UL DPCCH radio frame boundary;
- program code for aligning a transition of a UE_DTX_DRX_Enabled control signal from FALSE to TRUE to the HS-SCCH radio frame boundary, tagging a first DRX subframe to be 0, and then tagging a first DTX subframe to be 0, if the HS-SCCH radio frame boundary is detected before the UL DPCCH radio frame boundary;
- program code for aligning the transition of the UE_DTX_DRX_Enabled control signal from FALSE to TRUE to the UL DPCCH radio frame boundary, tagging the first DTX subframe to be 0, and then tagging the first DRX to be 0, if the UL DPCCH radio frame boundary is detected before the HS-SCCH radio frame boundary; and
- program code for monitoring configuration signals DL_DRX_Active and UL_DRX_Active, and if the configuration signals DL_DRX_Active is FALSE and UL_DRX_Active is TRUE, aligning the transition of the UE_DTX_DRX_Enabled control signal from FALSE to TRUE to the UL DPCCH radio frame boundary.

18. The computer-readable medium of claim 17 further comprising program code for transitioning the UE_DTX_DRX_Enabled control signal from FALSE to TRUE following an expiration of a delay timer.

19. The computer-readable medium of claim 17 further comprising:
- program code for determining that the configuration signal DL_DRX_Active is TRUE;
- program code for determining a second time if the HS-SCCH radio frame boundary is detected before the UL DPCCH radio frame boundary;
- program code for aligning the transition of the UE_DTX_DRX_Enabled control signal from FALSE to TRUE to the HS-SCCH radio frame boundary, tagging the first DRX subframe to be 0, and then tagging the first DTX subframe to be 0, if the HS-SCCH radio frame boundary is detected before the UL DPCCH radio frame boundary; and
- program code for aligning the transition of the UE_DTX_DRX_Enabled control signal from FALSE to TRUE to the UL DPCCH radio frame boundary, tagging the first DTX subframe to be 0, and then tagging the first DRX subframe to be 0, if the UL DPCCH radio frame boundary is detected before the HS-SCCH radio frame boundary.

* * * * *